US007696884B2

United States Patent
Luo et al.

(10) Patent No.: US 7,696,884 B2
(45) Date of Patent: Apr. 13, 2010

(54) SYSTEMS AND METHODS FOR ENHANCING THE MAGNETIC COUPLING IN A WIRELESS COMMUNICATION SYSTEM

(75) Inventors: Huan-Chin Luo, Taipei (TW); Lu-Shan Chiang, HsinChu (TW); Ying-Che Lo, HsinChu (TW); Chia-Jui Shen, Tainan (TW); Po-Chih Lai, Taizhong (TW); Kung-Hua Lee, Changhua (TW)

(73) Assignee: Macronix International Co., Ltd. (TW)

( * ) Notice: Subject to any disclaimer, the term of this patent is extended or adjusted under 35 U.S.C. 154(b) by 414 days.

(21) Appl. No.: 11/378,908

(22) Filed: Mar. 17, 2006

(65) Prior Publication Data
US 2007/0222602 A1     Sep. 27, 2007

(51) Int. Cl.
*G08B 13/14* (2006.01)
(52) U.S. Cl. .................. 340/572.7; 340/572.1; 343/731
(58) Field of Classification Search .............. 340/572.1, 340/572.2, 572.7, 572.8, 572.9; 343/866, 343/895, 731
See application file for complete search history.

(56) References Cited

U.S. PATENT DOCUMENTS

| | | | |
|---|---|---|---|
| 5,270,717 A | | 12/1993 | Schuermann |
| 5,580,664 A | * | 12/1996 | Tsai ........................... 428/457 |
| 6,480,110 B2 | * | 11/2002 | Lee et al. .................. 340/572.5 |
| 6,839,035 B1 | | 1/2005 | Addonisio et al. |
| 6,924,777 B2 | | 8/2005 | Reasoner et al. |
| 7,119,671 B2 | * | 10/2006 | Frank et al. .............. 340/457.1 |
| 7,126,552 B2 | | 10/2006 | Locatelli et al. |
| 7,439,863 B2 | * | 10/2008 | Suzuki et al. ............ 340/572.7 |
| 2005/0162331 A1 | * | 7/2005 | Endo et al. ................... 343/788 |

FOREIGN PATENT DOCUMENTS

TW     200632760     9/2006

\* cited by examiner

*Primary Examiner*—Anh V La
(74) *Attorney, Agent, or Firm*—Baker & McKenzie LLP

(57) ABSTRACT

An RFID system comprises an intermediate device that includes a first and second antenna coils connected together in a close loop format. The coils are formed on a flexible substrate that can be folded around a magnetic flux blocker such that one loop is on side of the blocker and the other loop is on the other side of the blocker. The intermediate device can then improve communication between a reader on one side of the blocker and a tag on the other. The coil on the reader side of the blocker can receive RF signals being generated by the reader and convert them to an electrical signal that can be passed to the coil on the tag side of the blockage. The second coil can then generate an RF signal that can be transmitted to the tag.

44 Claims, 6 Drawing Sheets

SYSTEMS AND METHODS FOR ENHANCING THE MAGNETIC COUPLING IN A WIRELESS COMMUNICATION SYSTEM

BACKGROUND

1. Field of the Invention

The embodiments described herein are directed to radio frequency communication systems, and more particular to systems and methods for extending the communication range in a radio frequency communication system.

2. Background of the Invention

Radio Frequency Identification (RFID) systems are a type of radio frequency communication system. RFID systems are gaining attention due to their ability to track and identify moving objects. In an RFID system, remote objects intended to be tracked and identified are equipped with a small RFID tag. The RFID tag contains a transponder and a digital memory chip that is given a unique electronic identification. An interrogator, or a reader can be configured to emit a signal that can activate the RFID tag. When an RFID tag passes within range of the reader, the RFID tag can detect the reader's signal and provide its identification information. The reader can be configured to decode the identification information, and in certain applications will write data to the RFID tag.

The signal generated by the reader is a Radio Frequency (RF) signal. RFID systems are generally configured to operate within four main frequency bands. The frequency bands are characterized by the frequency of operation for the RF signal generated by the reader. These bands include a low frequency band, i.e., 125 KHz or 134.2 KHz, a high frequency band, i.e., 13.56 MHz, a UHF frequency band, i.e., 868-956 MHz or 463 MHz, and a microwave frequency band, i.e., 2.4 GHz or 5.8 GHz.

An RFID reader generally comprises a radio transceiver configured to transmit and receive RF signal. The radio transceiver is coupled with one or more antennas that enable the transceiver to transmit and receive the RF signals. The transceiver is also interfaced with an encoder/decoder configured to decode information contained in the received signals and encode information to be transmitted via the transceiver.

RFID tags are generally classified as passive or active tags. A passive tag has no internal, or onboard power supply. Instead, a passive tag is powered by energy contained in the RF signal transmitted from the reader. The RF signal transmitted by the reader induces an electrical current in the tag antenna that supplies enough power to allow the tag to power up and transmit a response. Most passive tags signal to the reader by backscattering the RF carrier signal generated by the reader. This means that the tag antenna should be designed to both collect power from the incoming signal and also to transmit the outbound backscatter signal. It should be noted that the response signal generated by the tag can include more than just identification information.

An active tag, on the other hand, includes its own internal power source, which is used to power the tag in order to generate an outgoing signal. Active tags can have longer operational ranges and larger memories as compared to passive tags, which can allow the tag to store additional information sent by the reader; however, because passive tags do not require an onboard power supply, they can be made smaller and can cost significantly less than active tags. Additionally, due to their simplicity in design, passive tags are suitable for manufacture with conventional printing process for the antenna.

While passive tags provide many benefits that make them increasingly more popular for new RFID applications, one drawback is the limited operational range, e.g., as compared to active tags. One way to overcome the limited range problem, in certain applications, is to use a range extender. A range extender can be defined as an antenna, or resonator circuit, that can be placed between the reader and the tag and can be configured to receive the RF signal from the reader, amplify it, and rebroadcast it to the tag. Thus, the resonator circuit can be used to extend the range of communication ordinarily achievable between the reader and the tag.

Conventional range extenders do not necessarily help, however, when the limited range is due to some impediment to the RF signal being produced by the reader. RF signals are electromagnetic signals. Accordingly, the ability for a reader to communicate with the tag is dependent on the degree to which the RF signals produced by the reader and transmitted by the reader antenna magnetically coupled with the tag antenna. This means that the magnetic strength, or magnetic flux of the RF signal as seen by the tag is an important parameter.

Many materials act as magnetic flux blockers, i.e., they block the electromagnetic RF signals being generated by the reader. When limited communication range is the result of a magnetic flux blocker, a range extender will not necessarily overcome the problem. This is because the magnetic flux blocker will block the RF signals being generated and retransmitted by the range extender in the same manner that it will block the signals being generated by the reader.

As the applications for RFID technology grow, RFID tags are being included, or embedded in devices that are housed or contained in material that can act as a magnetic flux blocker. Accordingly, communication range can be limited for many of these new applications. Unfortunately, conventional range extenders will not necessarily be able to overcome some of the limited communication ranges for these new applications.

SUMMARY

An RFID system comprises an intermediate device that includes a first and second antenna coils connected together in a close loop format. The coils are formed on a flexible substrate that can be folded around a magnetic flux blocker such that one loop is on side of the blocker and the other loop is on the other side of the blocker. The intermediate device can then improve communication between a reader on one side of the blocker and a tag on the other. The coil on the reader side of the blocker can receive RF signals being generated by the reader and convert them to an electrical signal that can be passed to the coil on the tag side of the blockage. The second coil can then generate an RF signal that can be transmitted to the tag.

In one aspect, the intermediate device can be folded around a cellphone battery in order to enable a tag, e.g., disposed on a SIM card within the cellphone behind the battery, to communicate with the reader external to the cellphone.

In another aspect, the first antenna coil and the second antenna coil can comprise different dimensions.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which.

DETAILED DESCRIPTION

Figure 1B:
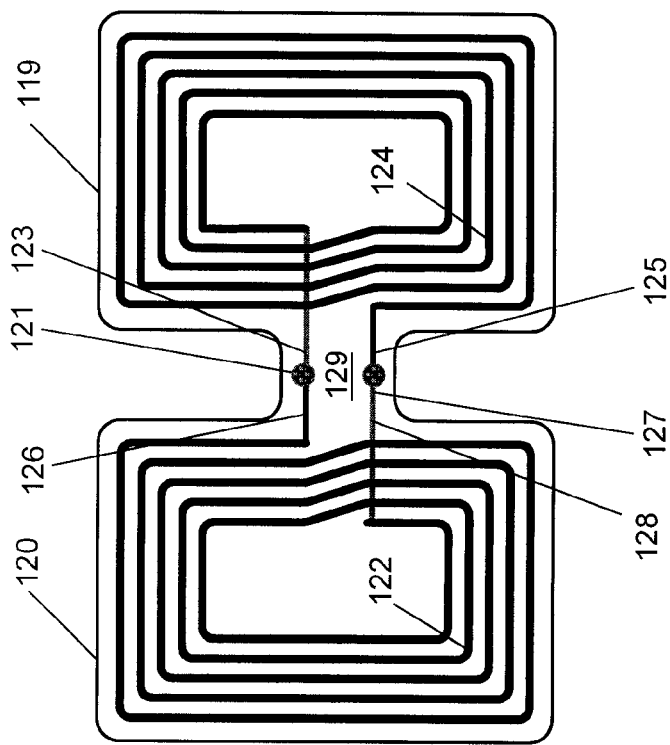
FIGS. 1A-1D are diagrams illustrating example embodiments of intermediate antennas configured in accordance with different embodiments.
Figure 1A:
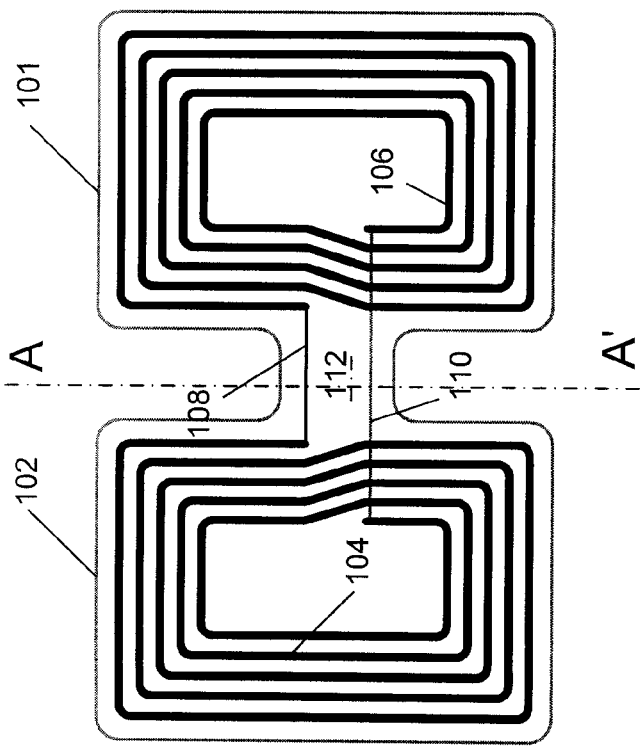

The embodiments described below are generally directed to RFID systems and devices; however, it will be understood that the systems and methods described herein can apply to other types of RF communication systems. Accordingly, the embodiments described herein should be seen as examples only and should not be seen as limiting the systems and methods described to any particular type of communications system.

It will also be understood that any dimensions, measurements, ranges, test results, numerical data, etc., are approximate in nature and unless otherwise stated not intended as precise data. The nature of the approximation involved will depend on the nature of the data, the context and the specific embodiments or implementations being discussed.

FIG. 1 is a diagram illustrating an antenna 102 comprising a first coil 104 and a second coil 106. Coils 104 and 106 can be formed, for example, on a substrate 101. For example, coils 104 and 106 can be formed from conductive material deposited or formed on substrate 101. The conductive material comprising coils 104 and 106 can be formed on substrate 101 using conventional printed wiring board processing techniques. For example, in embodiments where coils 104 and 106 and are fabricated from metal formed on substrate 101, conventional, printed wiring board processing techniques can be used. In other embodiments, the conductive material comprising coils 104 and 106 can be formed on substrate 101 using conventional printing processes, such as silk screening.

Substrate 101 can comprise of flexible substrate such as a flexible plastic or metal foil. By using a flexible substrate, antenna 102 can be configured so that it can flex, or bend around a object. For example, antenna 102 can be configured to bend around a magnetic flux blocker in order to enable communication between a reader and a tag even given the presence of the blocker.

Accordingly, substrate 101 can be constructed from a flexible material and can comprise a thin region 112 and antenna 102 can be configured so as to bend around the axis AA'. In other embodiments, a substrate 101 can comprise a rigid substrate beneath coils 104 and 106 and a flexible substrate in region 112 joining the two more rigid regions.

Substrate 101 can also comprise multiple conductive layers. For example, the top of substrate 101 is clearly a conductive layer comprising coils 104 and 106 and a connection 108 between the two; however, coils 104 and 106 also comprised second terminals that must be connected. These terminals cannot be directly connected on top of substrate 101 because the conductive connection running between the two would cross coils 104 and 106, shorting them out and impairing their performance. Thus, the second terminals of coils 104 and 106 can be connected via a conductive line 110 on the back of substrate 101. In this case, substrate 101 will comprise two conductive layers the top and the back.

It will be understood that in order to connect the terminals of antennas 104 and 106 via conductive line 110 on the back of substrate 101, conductive holes, or vias extending down through substrate 101 and in contact with coils 104 and 106 must be formed. On the back of substrate 101, conductive line 110 can also contact the vias and thereby electrically connect antennas 104 and 106.

In other embodiments, substrate 101 can actually comprised multiple laminated substrates and conductive line 110 can be formed from a conductive layer internal to substrate 101; however, it will be understood that for cost and ease of manufacturing, it is preferable that the only conductive layers on substrate 101 be on the top and bottom of substrate 101.

Coils 104 and 106 are configured so as to comprise two resonant circuits that can receive and transmit RF signal at the appropriate frequencies. Accordingly, the number of turns and dimensions associated with coils 104 and 106 must be configured so that each coil can receive and transmit RF signals at the appropriate frequency.

Coils 104 and 106 are electrically connected via connectors 108 and 110. Thus, when, e.g., an RF signal is impinged upon coil 104, coil 104 will produce an electrical signal that will be coupled via connectors 108 and 110 to coil 106. If coil 106 is constructed properly, then coil 106 will resonate at the appropriate frequency and reproduce an amplified version of the RF signal received by coil 104. In this manner, antenna 102 can act as a range extender; however, due to the flexible nature of substrate 101, antenna 102 can act as a range extender even in the presence of a magnetic flux blocker. This will be described in more detail below.

FIG. 1B is a diagram illustrating another example antenna 120 configured in accordance with another embodiment of the systems and methods describe herein. Antenna 120 comprises a first coil 122 and a second coil 124 formed on a substrate 119. As with substrate 101, substrate 119 can be a flexible substrate, or can at least comprise a flexible region 129. In the example of FIG. 1B, the terminals of antenna 122 and 124 are each connected via a conductive connector on top of substrate 119 and a conductive connector on the bottom of substrate 119, wherein the conductive connectors on top and bottom are connected by vias.

Thus, the first terminal of antenna 122 can be connected to a first terminal of antenna 124 through a conductive connecting line 126 on top of substrate 119 in a conductive connecting line 123 on the bottom of substrate 119. Conductor line 126 and conductor line 123 can then be connected by a via 121. Similarly, a second terminal of antenna 122 can be connected with the second terminal of antenna 124 by a conductive connecting line 128 on the bottom of substrate 119 and a conductive connecting line 125 on the top of substrate 119. Connecting line 128 and connecting line 125 can be connected by via 127.

Figure 1D:
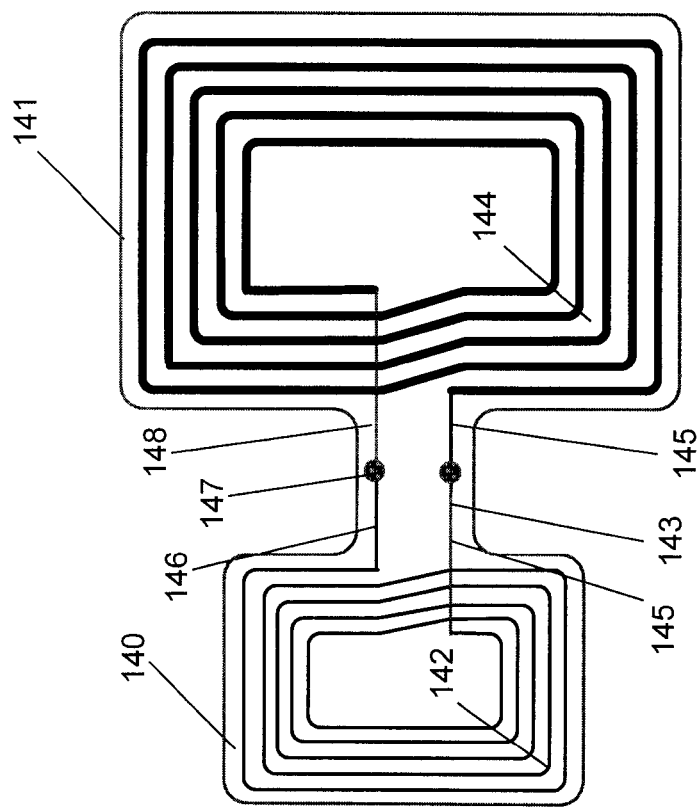
Figure 1C:
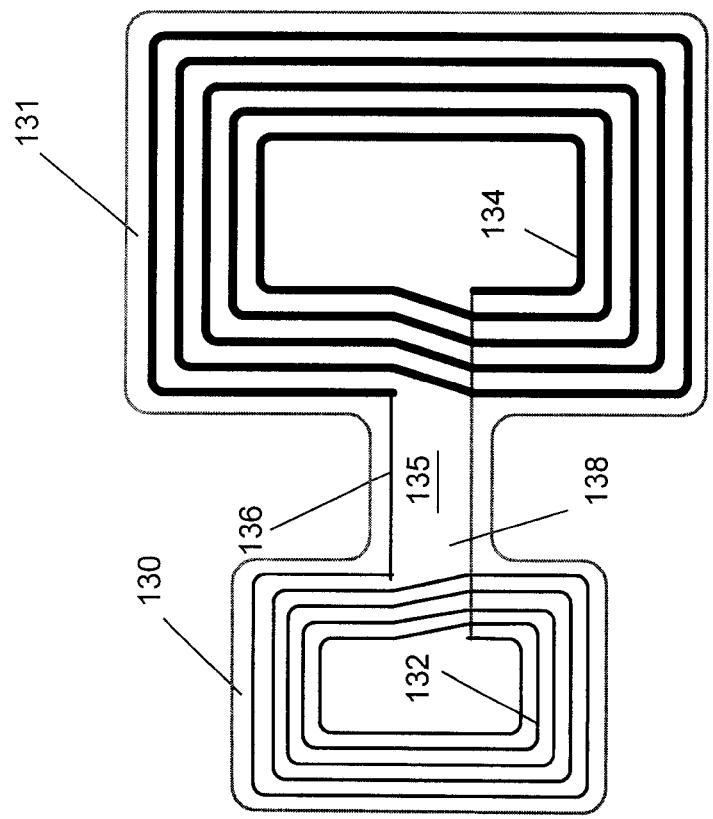

FIG. 1C is a diagram illustrating an example antenna 130 that comprises coils of different dimensions in accordance with another embodiment of the systems and methods described herein. As can be seen, coil 132 is smaller in dimension than coil 134. It must be kept in mind, however, that the number of coils and dimensions of each coil must still be sufficient to transmit and receive RF signals at the appropriate frequency. In the example of FIG. 1C, the first terminal of coil 132 is connected with the first terminal of coil 134 via connecting line 136 on top of substrate 131. The second terminal of coil 132 is connected to a second terminal of coil 134 by a connecting line 138 on the bottom of substrate 131. Connecting line 138 can be connected with the terminals of coils 132 and 134 by vias extending through substrate 131.

FIG. 1D is a diagram illustrating an example embodiment of antenna 140 comprising coils of different dimensions configured in accordance with another embodiment of the systems and methods described herein. In the example of FIG. 1D, coil 142, which is smaller than coil 144, is interfaced with the terminals of coil 144 by connecting line 146 on top of substrate 141, via 147, and connecting line 148 on the bottom of substrate 141. The other terminal of coil 142 is connected with the other terminal of coil 144 by conducting line 145 on the bottom of substrate 141, via 143, and connecting line 145 on the top of substrate 141.

The examples on FIGS. 1A-1D illustrate several examples of embodiments of antennas configured in accordance with the systems and methods described herein. It will be understood, however, that other embodiments are possible. For example, in other embodiments antennas configured in accordance with the systems and methods described herein can comprise coils of varying dimensions and shapes.

Figure 2:
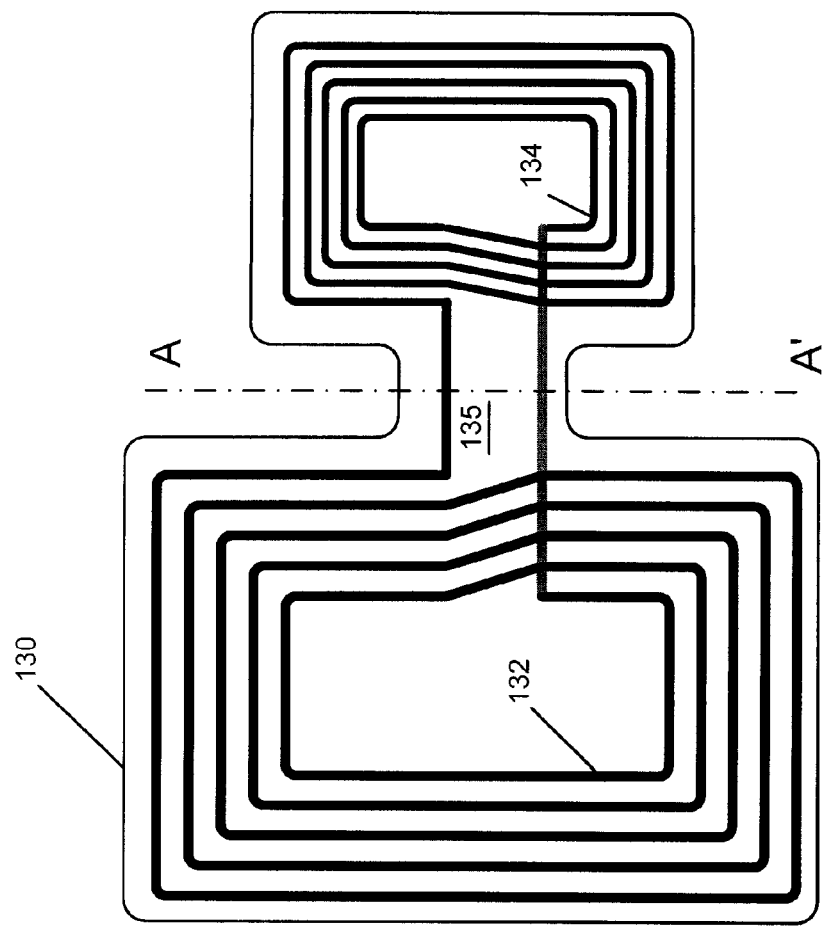
FIG. 2 is a diagram illustrating one of the antennas of FIGS. 1A-1D.
Figure 3:
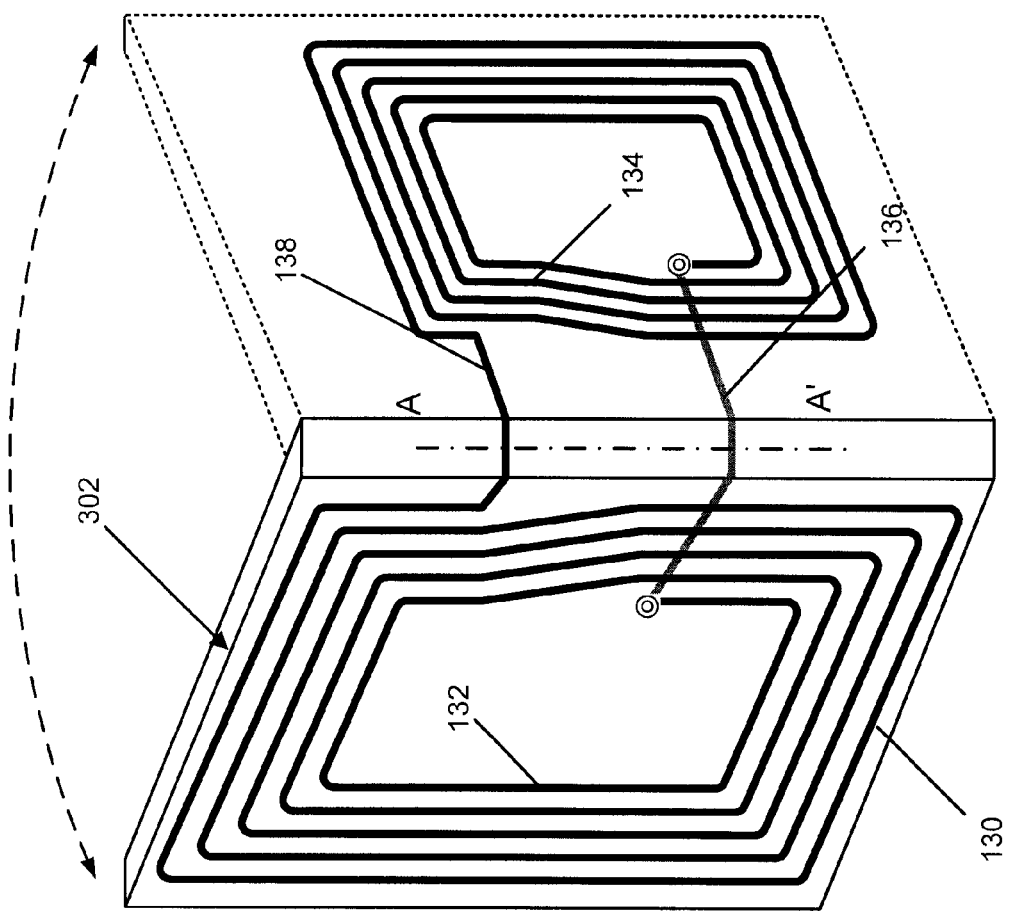
FIG. 3 is a diagram illustrating the antenna of FIG. 2 formed around a magnetic flux blocker.

FIG. 2 is a diagram illustrating antenna 130 which comprises of flexible portion 135 such that antenna 130 can flex or bend ground access AA'. A flexible portion 135 can be used in order to bend antenna 130 around a magnetic flux blocker. For example, as illustrated in FIG. 3, a magnetic flux blocker 302 can be disposed in the RF signaling path between a reader and tag. Without antenna 130, blocker 302 can prevent, or degrade communication between the reader and the tag. In order to overcome the effects of blocker 302, antenna 130 can be bent around battery 302 so that coil 132 is on one side of object 302 and coil 134 is on the other side of object 302.

Accordingly, signals, e.g., transmitted by the reader can be impinge on coil 134, which will cause an electrical signal to flow in coil 134. This electrical signal will be coupled with coil 132 via connecting lines 136 and 138 connecting the terminals of coils 134 and 132. The electrical signal will cause coil 132 to resonate and transmit an RF signal that is a recreation of the RF signal impinged upon coil 134. The signal transmitted by coil 132 can then be receive by the tag. Similarly, signals transmitted from the tag can be impinged on coil 132, which can create an electrical signal on coil 132 that would be passed to coil 134 via connectors 138 and 136. The electrical signals will cause coil 134 to resonate and transmit an RF signal that can be received by the interrogator.

It can be seen, therefore, that the magnetic flux blocker 302 can be overcome by the use of antenna 130.

Figure 4:
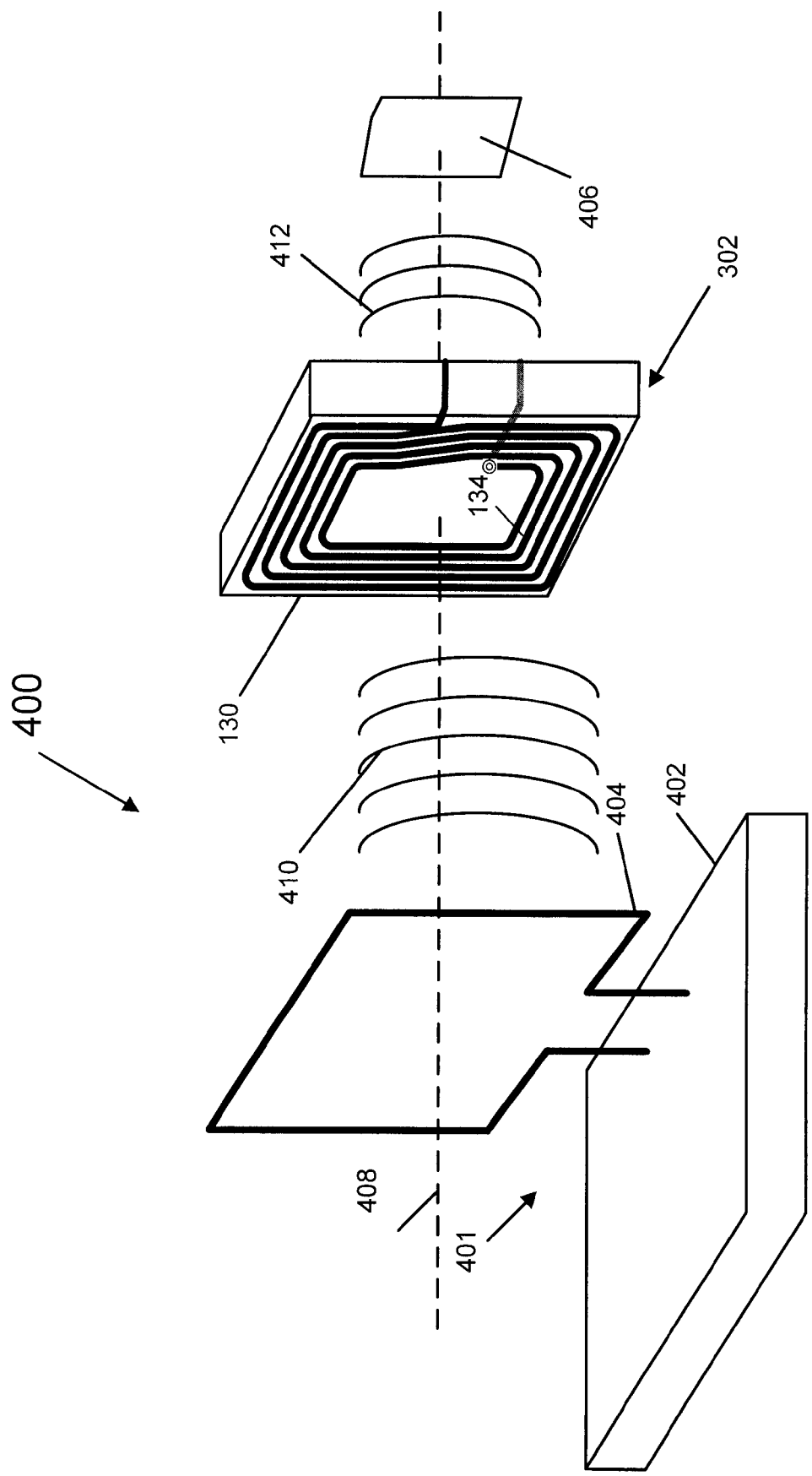
FIG. 4 is a diagram illustrating an RFID system comprising the intermediate antenna of FIG. 2 in accordance with one embodiment.

This can be illustrated with the aide of FIG. 4, which illustrates an RFID system 400 configured to allow communication between an interrogator 401 and a tag 406 even in the presence of a magnetic flux blocker 302. Interrogator 401 comprises a transceiver circuit 402 coupled with an antenna 404. Interrogator 401 can be configured to transmit RF signals 410 via antenna 404. RF signals 410 are intended for tag 406; however, magnetic flux blocker 302 is inline between antenna 404 and tag 406, and would otherwise block or degrade RF signal 410 in manner that can inhibit communication between interrogator 401 and tag 406. An antenna, such as antenna 130 has been folded around magnetic flux blocker 302. Thus, RF signals 410 will be impinged upon coil 134, which will cause an electric signal to flow on coil 134 that will be coupled with coil 132 on the back of magnetic flux blocker 302. The current will cause coil 132 to resonate and generate an RF signal 412 that can be transmitted to and received by tag 406.

In the example of FIG. 4, antenna 404, antenna 130, and tag 406 can be said to be aligned with a center orthogonal access 408. It will be understood that the alignment pictured in FIG. 4 can be preferred as it can result in the optimal magnetic coupling of RF signals 410 with coil 134 and RF signals 412 with the antenna included on tag 406. In other embodiments, the various antennas are not necessarily aligned as illustrated in FIG. 4, but it will be understood that the various antennas must be aligned sufficiently to ensure that enough magnetic energy in the various RF signals are sufficiently coupled with the various antennas.

In the example of FIG. 4, communications from interrogator 401 to tag 406 is illustrated but it will be understood that communication from tag 406 to interrogator 401 will operate in a similar manner.

It should be noted that communication in the face of a magnetic flux blocker can be achieved without the need to modify the tag or the reader. This can allow the reader and tag to manufactured for any application and avoids the need to make custom, or modified readers and tags, which can increase the cost of the reader, tag, and/or overall system.

As applications for RFID systems expands, RFID tags are being included, or affixed to more and smaller items. For example, it is anticipated that SIM cards included in wireless communication devices will include an RFID tag. The tag will need to be read by a reader external to the mobile communication device, but as it will be understood the SIM card is installed, or inserted internal to a mobile communication device. As a result, the many layers of the mobile communication device housing, and even the battery can act as magnetic flux blockers that can inhibit communication between an RFID tag included on a SIM card and an external reader.

An antenna, such as those illustrated in FIGS. 1A-1D, can be used to enable, or augment communication between an RFID tag on a SIM card internal to a mobile communication device and an external reader. This can be illustrated with the aide of FIG. 5, which illustrates an RFID reader 401 configured to communicate with an RFID tag 506 included on a SIM card 504 internal to a mobile communication device 502.

In addition to possibly the layers comprising the housing of mobile communication device 502, battery 510 is disposed between tag 504 and reader 401 and will act as a magnetic flux blocker. Accordingly, an antenna 512 is disposed around battery 510 in order to enable communication between reader 401 and tag 506. Accordingly, antenna 512 comprises a coil 514 on the outside of battery 510 and a coil 516 on the inside of battery 510 connected by conductive connecting lines 518 and 520. As with the embodiments described above, antenna 512 can be configured on a flexible, or partially flexible substrate such that it can be bent around battery 510 as illustrated.

Figure 5:
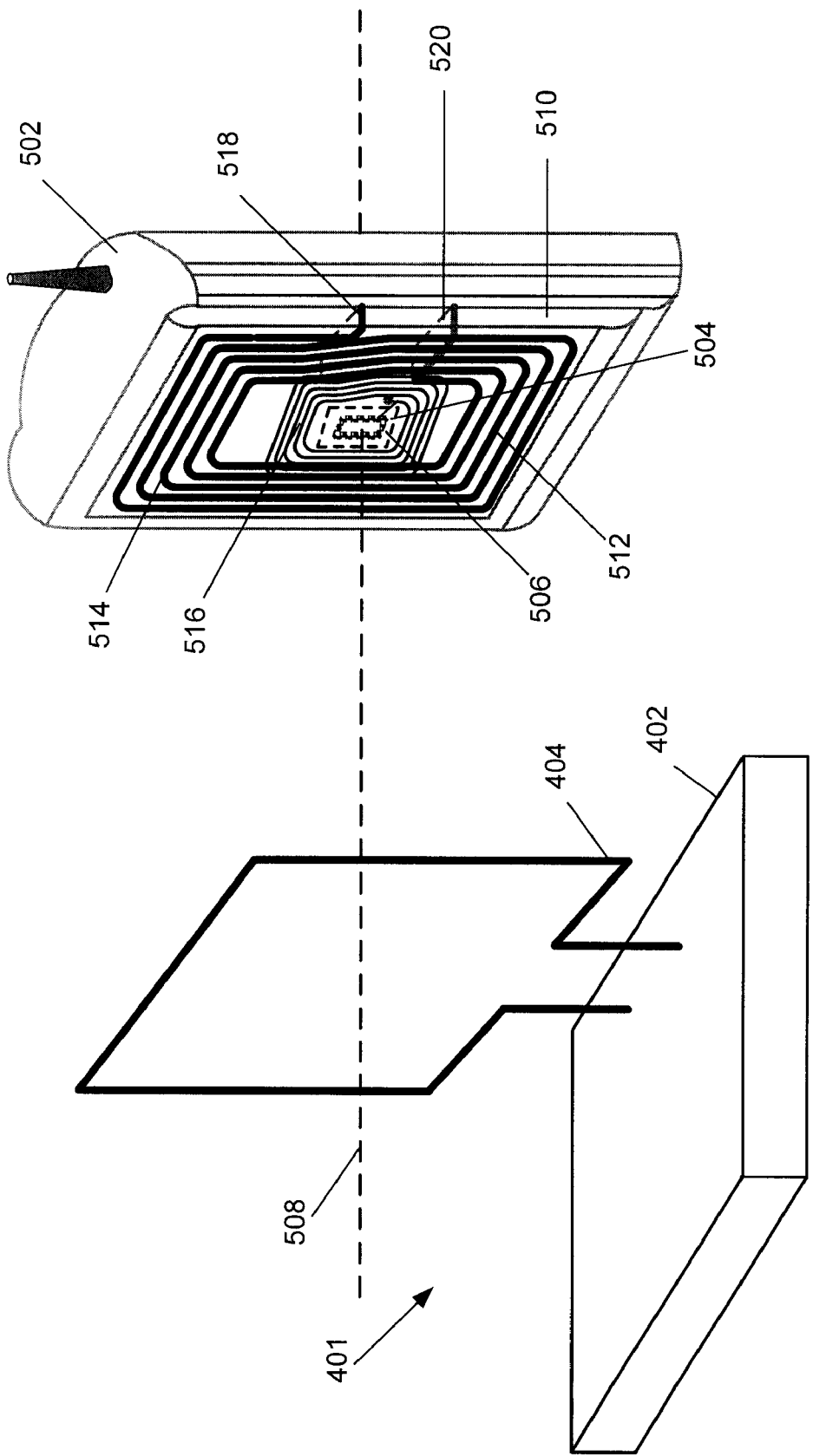
FIG. 5 is a diagram illustrating a mobile communication device comprising an intermediate antenna in accordance with one embodiment.

It will be understood that the example embodiment of FIG. 5 is just one possible practical application of an antenna configured in accordance with the systems and methods described herein. It will be further understood that many more practical applications are possible in order to allow a reader and a tag to communicate even in the presence of a magnetic flux blocker such as a battery or housing. Accordingly, the example on FIG. 5 should not be seen as limiting the systems and methods described herein to any particular application.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A wireless communication system, comprising:
a first communication device;

a second communication device configured to communicate with the first communication device via wireless communication signals; and a passive intermediate antenna formed around opposing surfaces of a magnetic flux blocker and interposed between the first and second communication devices, the passive intermediate antenna comprising a first coil and a second coil formed on a substrate, the substrate comprising a flexible portion between the first and second coils bent around the magnetic flux blocker.

2. The wireless communication system of claim 1, wherein the first communication device is a reader and the second communication device is a tag.

3. The wireless communication system of claim 1, wherein the first and second coils comprise the same number of turns.

4. The wireless communication system of claim 1, wherein the first and second coils comprise approximately the same dimensions.

5. The wireless communication system of claim 1, wherein the first and second coils comprise a different number of turns.

6. The wireless communication system of claim 1, wherein the first and second coils comprise different dimensions.

7. The wireless communication device of claim 1, wherein the first and second coils are approximately the same shape.

8. The wireless communication system of claim 1, wherein the first and second coils are of different shapes.

9. The wireless communication system of claim 1, wherein the first and second coils are tuned to operate at approximately 125 KHz or 134.2 KHz.

10. The wireless communication system of claim 1, wherein the first and second coils are tuned to operate at approximately 13.56 MHz.

11. The wireless communication system of claim 1, wherein the first and second coils are tuned to operate in a UHF frequency band.

12. The wireless communication system of claim 1, wherein the first and second coils are tuned to operate in a microwave frequency band.

13. A passive intermediate antenna for use in wireless communication system, the passive intermediate antenna configured to bend or form around opposing surfaces of a magnetic flux blocker in line between a first communication device and a second communication device, the passive intermediate antenna comprising:

a first coil configured to communicate with the first communication device;

a second coil configured to communicate with the second communication device;

a substrate comprising a first region on which the first coil is formed, a second region on which the second coil is formed, and a flexible region joining the first and second regions, the flexible region configured to enable the passive intermediate antenna to bend or form around the magnetic flux blocker.

14. The passive intermediate antenna of claim 13, wherein the entire substrate is a flexible substrate.

15. The passive intermediate antenna of claim 13, wherein at least one of the regions on which the first and second substrates are formed comprises a rigid substrate material.

16. The passive intermediate antenna of claim 13, wherein the first and second coils are electrically connected.

17. The passive intermediate antenna of claim 13, wherein the first and second coils are formed using printed wiring board techniques.

18. The passive intermediate antenna of claim 13, wherein the first and second coils are formed using printing processes.

19. The passive intermediate antenna of claim 13, wherein the first and second coils comprise the same number of turns.

20. The passive intermediate antenna of claim 13, wherein the first and second coils comprise approximately the same dimensions.

21. The passive intermediate antenna of claim 13, wherein the first and second coils comprise a different number of turns.

22. The passive intermediate antenna of claim 13, wherein the first and second coils comprise different dimensions.

23. The passive intermediate antenna of claim 13, wherein the first and second coils are approximately the same shape.

24. The passive intermediate antenna of claim 13, wherein the first and second coils are of different shapes.

25. The passive intermediate antenna of claim 13, wherein the first and second coils are tuned to operate at approximately 125 KHz or 134.2 KHz.

26. The passive intermediate antenna of claim 13, wherein the first and second coils are tuned to operate at approximately 13.56 MHz.

27. The passive intermediate antenna of claim 13, wherein the first and second coils are tuned to operate in a UHF frequency band.

28. The passive intermediate antenna of claim 13, wherein the first and second coils are tuned to operate in a microwave frequency band.

29. A wireless communication device, comprising:

an internal wireless communication tag configured to communicate with an external reader;

a battery disposed between the internal wireless communication tag and the external reader; and an intermediate antenna configured to bend or form around the battery, the intermediate antenna comprising:

a first coil configured to communicate with the external reader, a second coil configured to communicate with the internal wireless communication tag, a substrate comprising a first region on which the first coil is formed, a second region on which the second coil is formed, and a flexible region joining the first and second regions, the flexible region configured to enable the intermediate antenna to bend or form around the battery.

30. The wireless communication device of claim 29, wherein the entire substrate is a flexible substrate.

31. The wireless communication device of claim 29, wherein at least one of the regions on which the first and second substrates are formed comprises a rigid substrate material.

32. The wireless communication device of claim 29, wherein the first and second coils are electrically connected.

33. The wireless communication device of claim 29, wherein the first and second coils are formed using printed wiring board techniques.

34. The wireless communication device of claim 29, wherein the first and second coils are formed using printing processes.

35. The wireless communication device of claim 29, wherein the first and second coils comprise the same number of turns.

36. The wireless communication device of claim 29, wherein the first and second coils comprise approximately the same dimensions.

37. The wireless communication device of claim 29, wherein the first and second coils comprise a different number of turns.

38. The wireless communication device of claim 29, wherein the first and second coils comprise different dimensions.

39. The wireless communication device of claim 29, wherein the first and second coils are approximately the same shape.

40. The wireless communication device of claim 29, wherein the first and second coils are of different shapes.

41. The wireless communication device of claim 29, wherein the first and second coils are tuned to operate at approximately 125 KHz or 134.2 KHz.

42. The wireless communication device of claim 29, wherein the first and second coils are tuned to operate at approximately 13.56 MHz.

43. The wireless communication device of claim 29, wherein the first and second coils are tuned to operate in a UHF frequency band.

44. The wireless communication device of claim 29, wherein the first and second coils are tuned to operate in a microwave frequency band.

* * * * *